(12) United States Patent
Kolich et al.

(10) Patent No.: US 9,566,888 B2
(45) Date of Patent: Feb. 14, 2017

(54) VEHICLE SEAT HAVING EXTENDABLE BOLSTERS AND THIGH SUPPORTS

(71) Applicant: FORD GLOBAL TECHNOLOGIES, LLC, Dearborn, MI (US)

(72) Inventors: Michael Kolich, Windsor (CA); Amber LaVerne Hall, Oak Park, MI (US); Marcos Silva Kondrad, Macomb Township, MI (US); Sean David Fannin, Taylor, MI (US); Johnathan Andrew Line, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/676,041

(22) Filed: Apr. 1, 2015

(65) Prior Publication Data

US 2016/0288680 A1    Oct. 6, 2016

(51) Int. Cl.
*B60N 2/02*    (2006.01)
*B60N 2/62*    (2006.01)
*B60N 2/44*    (2006.01)

(52) U.S. Cl.
CPC ............. *B60N 2/62* (2013.01); *B60N 2/0224* (2013.01); *B60N 2/0284* (2013.01); *B60N 2/442* (2013.01); *B60N 2/4492* (2015.04)

(58) Field of Classification Search
CPC ....... B60N 2/62; B60N 2/0284; B60N 2/0224; B60N 2/4492
USPC ................... 297/69, 423.17, 423.19, 284.11
See application file for complete search history.

(56) References Cited

U.S. PATENT DOCUMENTS

| | | |
|---|---|---|
| 4,324,431 A | 4/1982 | Murphy et al. |
| 4,629,248 A | 12/1986 | Mawbey |
| 4,767,155 A * | 8/1988 | Kousaka ............... B60N 2/62 297/284.1 |
| 5,658,050 A | 8/1997 | Lorbiecki |
| 5,692,802 A | 12/1997 | Aufrere et al. |
| 5,758,924 A | 6/1998 | Vishey |
| 6,079,781 A | 6/2000 | Tilley |
| 7,966,835 B2 | 6/2011 | Petrovski |

(Continued)

FOREIGN PATENT DOCUMENTS

| | | | |
|---|---|---|---|
| DE | 102004016315 A1 * | 10/2005 | ............. B60N 2/449 |
| DE | 10 2006 061 226 | 6/2008 | |

(Continued)

*Primary Examiner* — Ryan Kwiecinski
(74) *Attorney, Agent, or Firm* — Vichit Chea; Price Heneveld LLP

(57) ABSTRACT

A vehicle seating assembly for a vehicle has a lower seat with a center seat cushion and a forward thigh supporting portion having a first refracted position and a second extended position. A leading edge of the forward thigh supporting portion is longitudinally displaced forward of the lower seat in the second extended position relative the first retracted position. A seat bolster is coupled with the forward thigh supporting portion extending laterally from at least one side of the seat, wherein the seat bolster has a first retracted position and a second extended position. A user control is operational to move the forward thigh supporting portion between the first retracted position and the second extended position, which simultaneously moves the seat bolster relative to the center seat cushion, respectively, between the first retracted position and a second extended position of the seat bolster.

19 Claims, 5 Drawing Sheets

(56) References Cited

U.S. PATENT DOCUMENTS

| | | | |
|---|---|---|---|
| 8,408,646 B2* | 4/2013 | Harper | B60N 2/02 297/284.11 |
| 8,516,842 B2 | 8/2013 | Petrovski | |
| 2005/0029846 A1* | 2/2005 | Jonas | A47C 1/023 297/284.3 |
| 2007/0200398 A1 | 8/2007 | Wolas et al. | |
| 2008/0174164 A1* | 7/2008 | Becker | B60N 2/62 297/452.55 |
| 2009/0058150 A1* | 3/2009 | Whalen | A47C 7/50 297/69 |
| 2009/0091172 A1* | 4/2009 | Kim | B60N 2/0284 297/337 |
| 2009/0212611 A1* | 8/2009 | Gloriosa | B60N 2/0232 297/217.3 |
| 2013/0285426 A1 | 10/2013 | Arant et al. | |
| 2013/0320730 A1* | 12/2013 | Aselage | B60N 2/0284 297/337 |
| 2014/0203606 A1 | 7/2014 | Line et al. | |
| 2014/0203607 A1* | 7/2014 | Line | B60N 2/0284 297/311 |
| 2014/0203617 A1* | 7/2014 | Line | B60N 2/4495 297/423.29 |
| 2016/0090010 A1* | 3/2016 | Line | B60N 2/0284 297/284.3 |

FOREIGN PATENT DOCUMENTS

| | | | | |
|---|---|---|---|---|
| DE | 10 2012 006 074 | | 11/2012 | |
| EP | 0 670 240 | | 2/1995 | |
| FR | 2907384 A1 | * | 4/2008 | ........... B60N 2/0284 |
| GB | 1168927 A | * | 10/1969 | ............. A47C 1/022 |
| JP | 2011-251573 | | 12/2011 | |
| KR | 10-2008-0066428 | | 7/2008 | |
| KR | 10 2011 0051692 | | 5/2011 | |
| KR | 10-1180702 | | 9/2012 | |
| WO | 2010096307 | | 8/2010 | |

\* cited by examiner

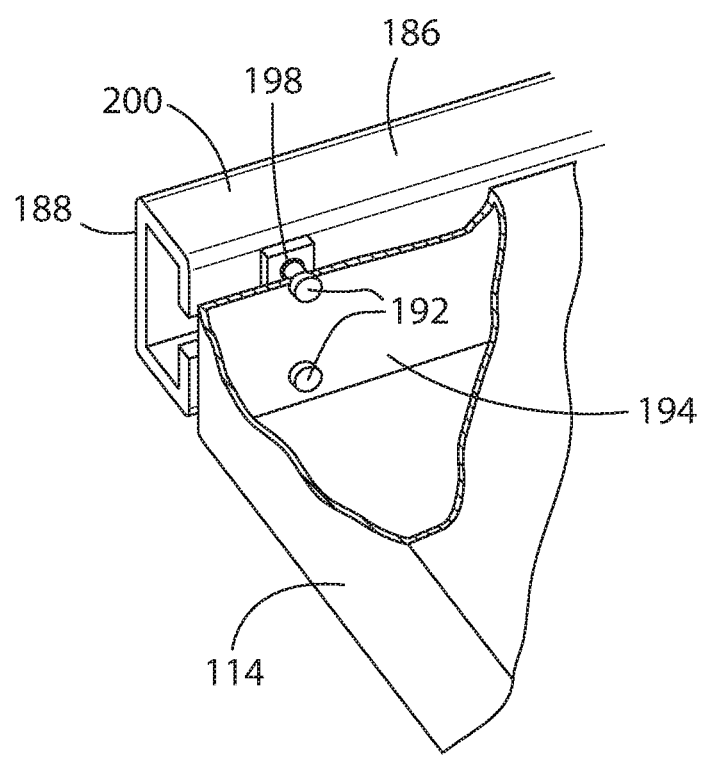

VEHICLE SEAT HAVING EXTENDABLE BOLSTERS AND THIGH SUPPORTS

FIELD OF THE INVENTION

The present invention generally relates to a vehicle seating assembly for a vehicle, and more particularly to a vehicle seating assembly with extendable seat bolsters and thigh supports.

BACKGROUND OF THE INVENTION

Seat bolsters are generally configured to provide supplemental support to the back and thighs of a vehicle passenger. In combination with extendable thigh supports that articulate in the forward direction, existing bolsters of existing seat designs remain fixed. In the case of larger passengers, an uncomfortable gap between the bolster and the extended thigh support can occur where the outer edges of the passenger thighs are not supported because the bolsters do not extend with the thigh supports. Accordingly, there is a need to have a vehicle seating assembly having an articulating thigh support that simultaneously maintains support of the passenger thighs when the thigh support is extended.

SUMMARY OF THE INVENTION

One aspect of the present invention includes a vehicle seating assembly for a vehicle having a lower seat and a seatback. The lower seat has a center seat cushion and a forward thigh supporting portion having a first retracted position and a second extended position. A leading edge of the forward thigh supporting portion is longitudinally displaced forward of the lower seat in the second extended position relative the first retracted position. A seat bolster is coupled with the forward thigh supporting portion extending laterally from at least one side of the seat, wherein the seat bolster has a first retracted position and a second extended position. A user control is operational to move the forward thigh supporting portion between the first retracted position and the second extended position, which simultaneously moves the seat bolster relative to the center seat cushion, respectively, between the first refracted position and a second extended position of the seat bolster.

Another aspect of the present invention includes a vehicle seating assembly for a vehicle having a seatback and a seat. The seat has an extendable and retractable thigh support and bolsters extending laterally from the seat. A control is operably coupled to a motor, wherein the bolsters are slidably supported on a side of the thigh support, and adjustment of the thigh support between a forward position and a rearward position simultaneously adjusts the bolsters between a forward position and a rearward position.

Yet another aspect of the present invention includes a vehicle seating assembly for a vehicle having a seatback and a seat. A thigh support is moveable longitudinally forward and rearward between a fully extended position and a fully retracted position. Bolsters extend laterally from the seat and operatively coupled with the thigh support and are moveable between a fully extended position and a fully retracted position. A seat pan is operatably coupled with the thigh support and moveable longitudinally forward and rearward between a fully extended position and a fully retracted position. A seat base is fixedly mounted relative the seat pan and supports the seat pan.

A still further aspect of the present invention includes a vehicle seating assembly having bolsters laterally extending from the seat. The bolsters are configured to come into abutting contact with a vehicle passenger regardless of the position of an adjacent thigh support. The bolsters provide support and minimize passenger movement during vehicle movement. This allows the vehicle passenger to enjoy a safer and more secure driving experience.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 8 is top perspective view with a partial cross-sectional view of the subtrack and seat pan interface.

DETAILED DESCRIPTION OF THE EMBODIMENTS

Figure 1:
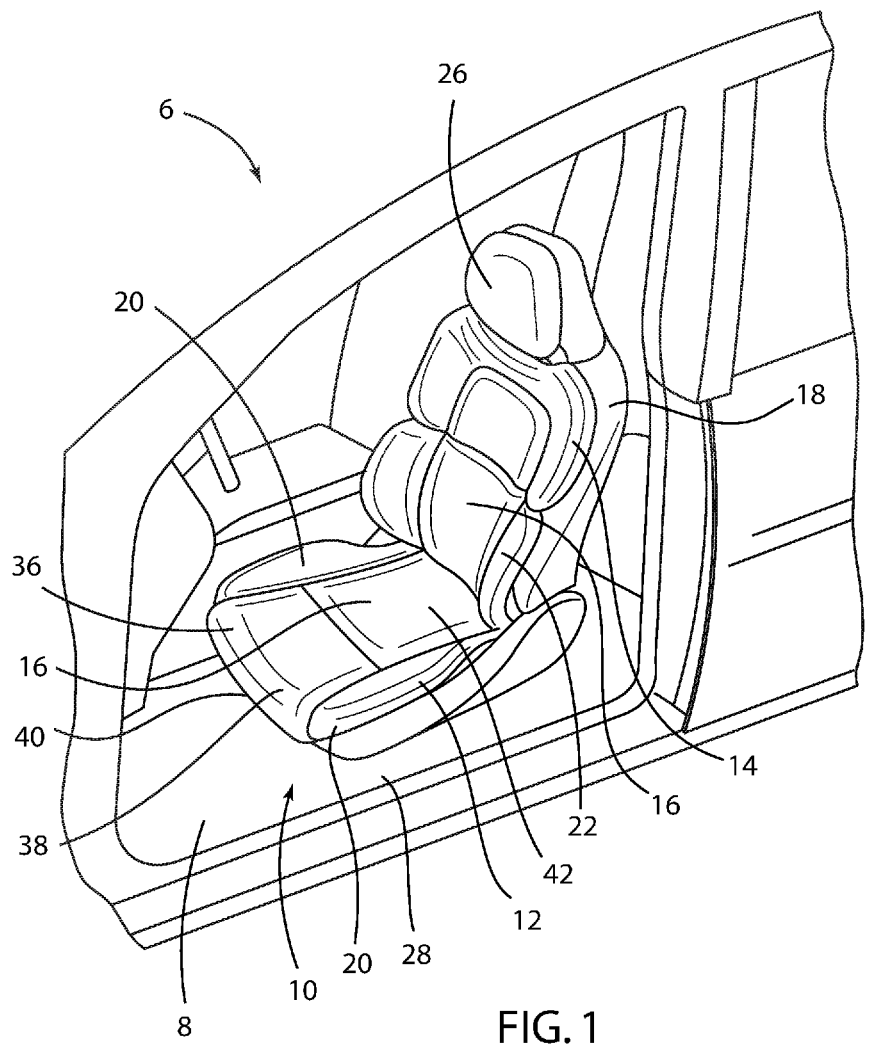
FIG. 1 is a side perspective view of a vehicle seating assembly according to the present invention installed in a motor vehicle.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
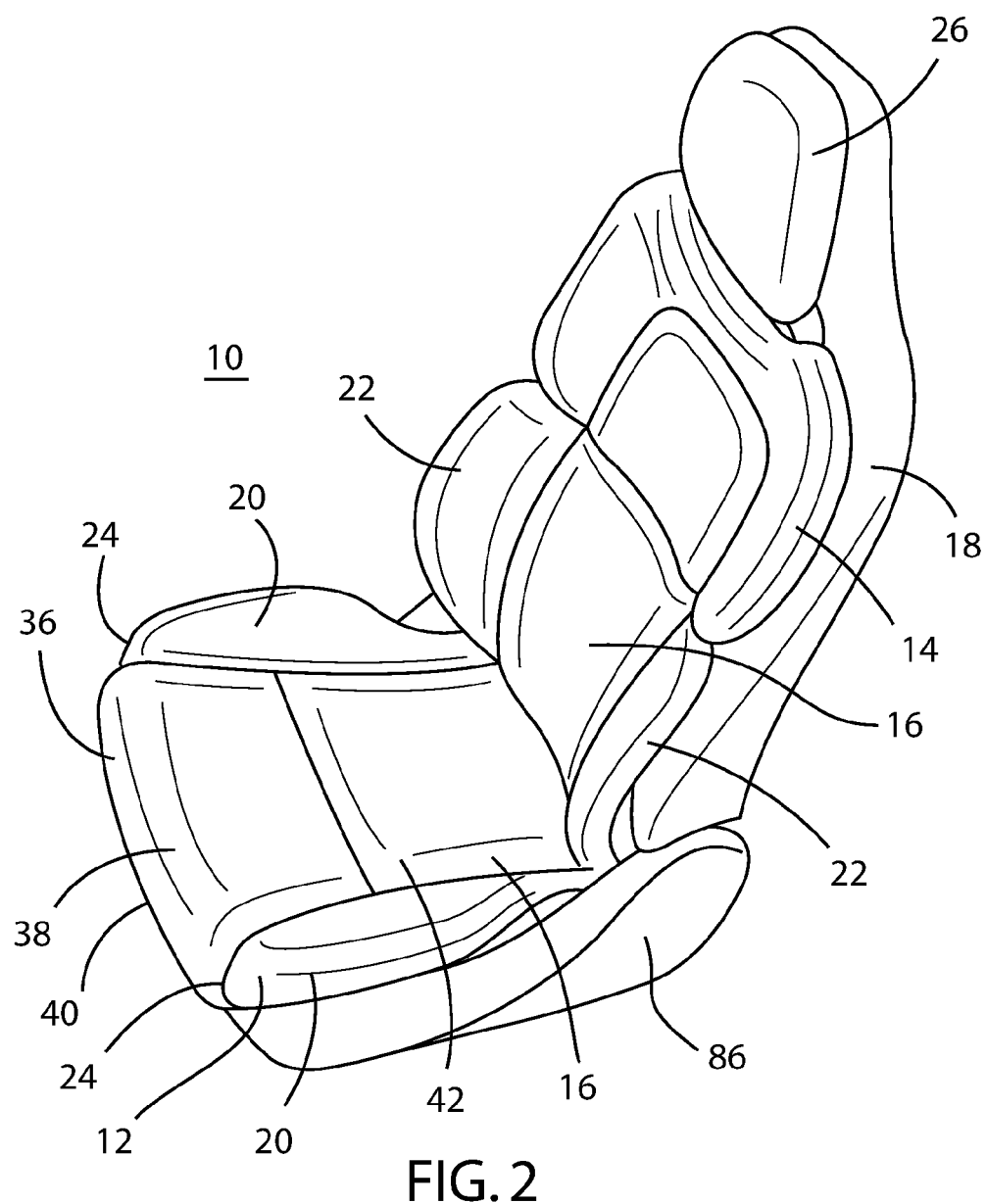
FIG. 2 is a side perspective view of a vehicle seating assembly according to the present invention.

Referring to FIGS. 1-2, reference numeral 10 generally designates a vehicle seating assembly for use in a vehicle passenger compartment 8 of a motor vehicle 6. The vehicle seating assembly 10 generally includes a lower seat 12 and a raised seatback support 14. The vehicle seating assembly 10 may be a seat for a driver, a seat for a passenger, a rear bucket seat, a rear row of seats, or any other vehicle seat. Moreover, the vehicle seating assembly 10 may also include a head restraint 26 operably coupled to the raised seatback support 14 of the vehicle seating assembly 10, wherein the raised seatback support 14 is adapted to recline to a variety of angles relative to the lower seat 12. The vehicle seating assembly 10 also includes an upholstered external surface 16 on the lower seat 12 and raised seatback support 14 for supporting the passenger, with a hard back panel 18 on the rear of the raised seatback support 14. The vehicle seating assembly 10 is supported on rail assemblies 30 mounted to a floor pan 28.

The lower seat 12 is provided with a cushion 36 having a forward extendable thigh support 38 having a forward edge 40 moveable fore and aft relative a rearward stationary portion 42. The cushion 36 is configured to provide a comfortable seating surface to the passenger. The cushion 36 allows the bolsters 20, 22 to be hidden from view and not be felt by the passenger when occupying the vehicle seating assembly 10. The cushion 36 also provides the vehicle seating assembly 10 with a uniform look and feel. While only a single extendable thigh support 38 is disclosed herein, it should be understood that a pair of side-by-side and separately extendable thigh supports 38 could be employed, one for each of the right and left legs of the passenger.

Bolsters 20, 22 preferably extend laterally from each of the lower 12 seat base and/or the raised seatback support 14, respectively. In the illustrated embodiment shown in FIG. 2, each of the lower seat 12 and the raised seatback 14 includes the bolsters 20, 22 that extend from side portions thereof, respectively. The bolsters 20 of the lower seat 12 are configured to provide lateral support to a vehicle passenger. The bolsters 20 are disposed on each side of the cushion 36. A particularly advantageous aspect of the present disclosure provides for a vehicle seating assembly 10 in which the bolsters 20 can move forward as the forward edge 40 of the cushion 36 elongates forward. This allows the forward edge 24 of the bolsters 20 and the forward edge 40 of the elongated thigh support 38 to be a contiguous surface to support the thighs of a passenger. As noted above, previous seat designs do not permit for support at the edge of the thighs where the thighs are being supported by the elongated lower seat 12, given that the forward edge 24 of the bolsters 20 of the prior designs stay fixed, while the forward edge 40 of the center seat cushion 38 elongates.

The solution to the aforementioned drawback is shown in FIGS. 3 through 8. The lower seat 12 of the seat assembly 10 includes a seat base 112 upon which the lower seat 12 is supported. A seat pan 114 is operably connected to the seat base 112. Cooperating longitudinal channels 165, 166 may be positioned on one of the seat pan 114 and the seat base 112, respectively, to facilitate sliding longitudinal movement of the seat pan 114 relative the seat base 112. A rod 116 extends across the seat base 112 into elongated slots 118 in the seat pan 114. A motor 126 includes a drive shaft 128 operably connected with the rod 116 and adapted to rotate the rod 116.

The cushion 36 extends over the seat pan 114 and seat base 112 and is designed to provide support to the underside of the legs of a passenger. A pliable fabric 138 is positioned over the cushion 36 to protect the cushion 36 and provide an aesthetic appearance. The cushion 36 is flexible and allows for movement of the seat pan 114 relative to the seat base 112 without damaging the cushion 36 or the fabric 138 disposed on the cushion 36. Preferably, the pliable fabric 138 includes a center portion 130 that is fabricated from a highly elastic and flexible fabric, such as a spanex-like material that covers the resulting gap as the forward thigh supporting portion 38 is moved forward. The vehicle seating assembly 10 is supported on the seat rail assemblies 30 on forward and rearward legs 140, 142. The forward and rearward legs 140, 142 are thereby attached to a floor pan 28. Alternatively, the rail assemblies 30 can be omitted with the forward and rearward legs 140, 142 directly mounted to the floor pan 28. Accordingly, when the seat assembly 10 moves forward or rearward, the vehicle seating assembly 10 moves relative to the forward and rearward legs 140, 142.

Figure 3:
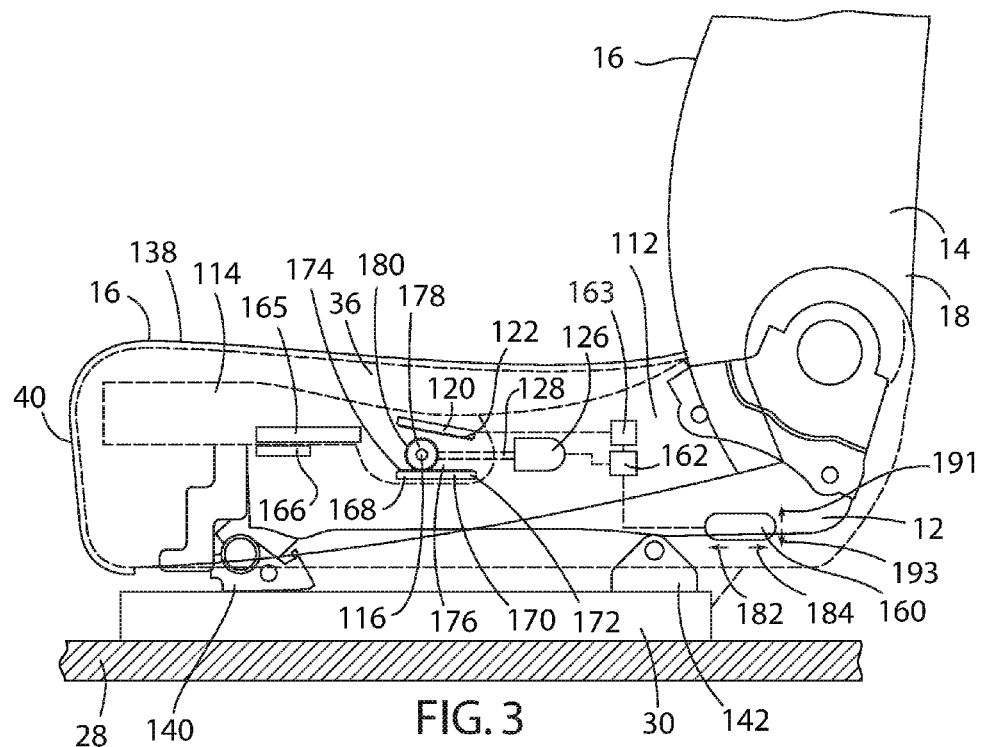
FIG. 3 is a side cross-sectional plan view of the vehicle seating assembly of FIG. 2 in a retracted condition.
Figure 4:
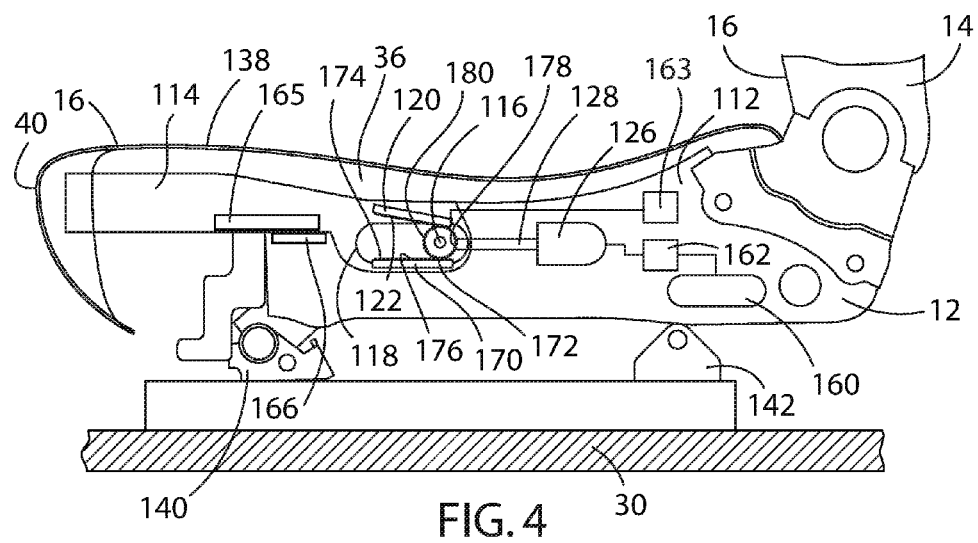
FIG. 4 is a side cross-sectional plan view of the vehicle seating assembly of FIG. 2 in an extended condition.
Figure 5:
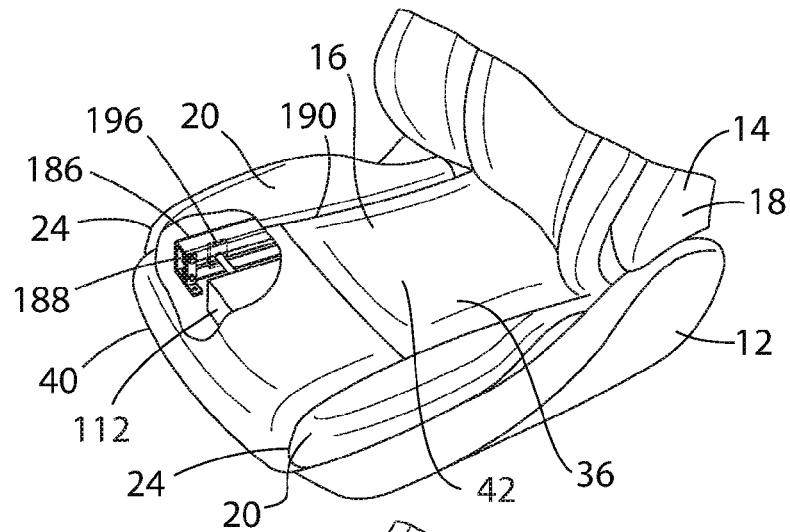
FIG. 5 is a top perspective view with a partial cross-sectional view of the lower seat in the fully retracted position.
Figure 6:
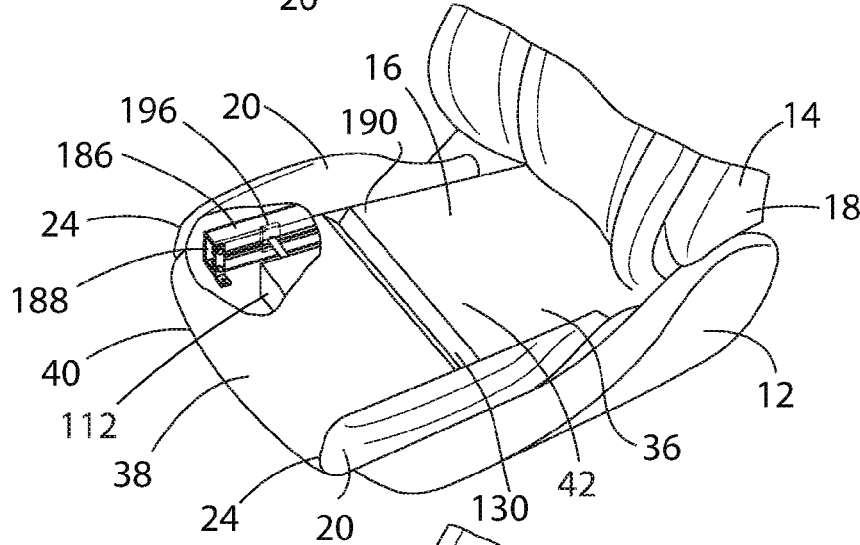
FIG. 6 is a top perspective view with a partial cross-sectional view of the lower seat in the partially retracted position.
Figure 7:
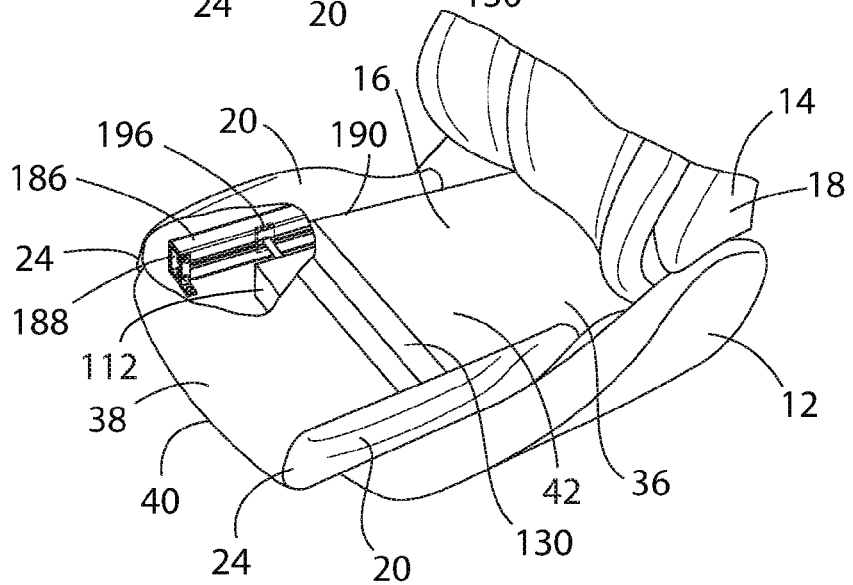
FIG. 7 is a top perspective view with a partial cross-sectional view of the lower seat in the fully extended position.

Referring to the Figures, the seat pan 114 of the vehicle seating assembly 10 is operatably coupled with the moveable thigh supports 38 and is generally moveable longitudinally forward and rearward between a fully retracted position, as shown in FIGS. 3 and 5, and a fully extended position, as shown in FIGS. 4 and 7. The forward edge 40 of the lower seat 12 of the vehicle seating assembly 10 is also pivotally moveable up and down between a fully lowered position and a fully raised position. More specifically, the lower seat 12 of the vehicle seating assembly 10 is designed to extend forward such that adequate support can be provided below the legs of the passenger. Further, the lower seat 12 of the vehicle seating assembly 10 is upwardly pivotal to provide vertical support to the underside of the legs of the passenger. In addition, the lower seat 12 of the vehicle seating assembly 10 is adjustable to any of a variety of positions between the fully retracted position and the fully extended position and between the fully lowered position and the fully raised position when in the fully extended position.

As shown in FIGS. 3 and 5, the thigh support 38 and bolsters 20, along with their respective forward edges 40, 24, respectively, are depicted in the fully retracted position. In this position, the operable length of the lower seat 12 is at its shortest. That is, the available surface area of the vehicle seating assembly 10 that is available to support a passenger is minimized. When the vehicle seating assembly 10 is in the fully retracted position, the rod 116 is positioned over a forward end 168 of a base engagement member 170, as best seen in FIG. 3. The base engagement member 170 has a generally linear rack construction with a plurality of teeth 174 disposed in a top side 176 thereof. The rod 116 extends through and is connected with a drive gear 178 that has a plurality of teeth 180 adapted to engage the teeth 174 on the base engagement member 170. It should be understood that a pair of base engagement members 170 and hears 178 may be employed and positioned on either side of the lower seat 12.

In operation, a toggle switch 160 is operably connected with a controller 162 that regulates the motor 126. The toggle switch 160 receives directional instructions from the passenger and forwards those instructions to the controller 162, which activates and controls the motor 126. For example, when the user pushes the toggle switch 160 in a forward direction as shown by the forwardly pointed arrow 182, the controller 162 activates the motor 126, which consequently rotates the drive shaft 128 and therefore the rod 116 in a clockwise fashion. When the rod 116 rotates in a clockwise fashion, teeth 180 of the drive gear 178 act on and push the teeth 174 of the base engagement member 170 in a forward direction denoted by arrow 182. As the base engagement member 170 is urged forward, so is the seat pan 114, which is fixedly connected to the base engagement member 170. When the seat pan 114 reaches the fully extended position, the drive gear 178 is at the rearward end 172 of the base engagement member 170, and the controller 162 deactivates the motor 126, leaving the seat pan 114 at the fully extended position 152. The seat pan 114 thus moves longitudinally fore and aft relative to the seat base 112 to elongate the lower seat 12 of the vehicle seating assembly 10, thereby moving the forward edges 40, 24 of the thigh support 38 and bolsters 20, as shown in FIGS. 3 and 7, respectively.

To return the forward edges 40, 24 of the thigh support 38 and bolsters 20 to the fully retracted position, the passenger pushes the toggle switch 160 in the direction of rearwardly pointed arrow 184. Movement of the toggle switch 160 in the direction of rearwardly pointed arrow 184 causes the controller 162 to activate the motor 126, which consequently rotates the drive shaft 128 in an opposite direction than when the toggle switch 160 is pushed in the direction of forwardly pointed arrow 182. The rod 116 consequently rotates in a counterclockwise fashion. When the rod 116 rotates in a counterclockwise fashion, the teeth 180 of the drive gear 178 act on and push the teeth 174 of the base engagement member 170 in a rearward direction denoted by arrow 184. As the base engagement member 170 is urged rearward, so is the seat pan 114, which is fixedly connected to the base engagement member 170. When the seat pan 114 reaches the fully retracted position, the drive gear 178 is returned to the forward end 168 of the base engagement member 170. At the same time, the controller 162 deactivates the motor 126, leaving the seat pan 114 at the fully refracted position.

A tilt engagement member 120, also of a generally linear rack construction with a plurality of teeth 122 disposed thereon, is operable between a first position out of contact with the drive gear 178 and a second position in contact with the drive gear 178 when the cushion 36 is in the fully extended position. Rotation of the drive shaft 128, when the tilt engagement member 120 is in the first position (out of contact), as shown in FIG. 3, causes longitudinal displacement of the seat pan 114 as described above. To extend or retract the seat pan 114, the passenger then pushes the toggle switch 160 forward or rearward, which first activates the solenoid 163, thereby causing the engagement member 120 to pivotally rotate upward. The controller 162 then sends a signal to the motor 126 to rotate the rod 116 to move the seat pan 114 forward or rearward.

However, when the passenger desires to move the forward edges 40, 24 of the thigh support 38 and bolsters 20 up, and thereby tilt the lower seat 12, the passenger pushes the toggle switch 160 upward in the direction of arrow 191, which activates the solenoid 163 to cause the tilt engagement member 120 to pivotally rotate downward so that the teeth 122 on the tilt engagement member 120 engage the teeth 180 of the drive gear 178. The controller 162 then sends a signal to the motor 126 to rotate the rod 116 to rotate the gear 178. Clockwise rotation of the drive shaft 128 when the tilt engagement member 120 is in the second position (in contact) causes clockwise rotation of the rod 116 and causes the seat pan 114 forward edge 40 to tilt upward. The reverse of this process may be obtained by pushing the toggle switch 160 downward in the direction of arrow 193.

As noted above, the bolsters 20 are also moveable to a forward position as the forward edge 40 of the thigh support 38 moves forward and the cushion 36 elongates. As shown in FIGS. 5-8, the bolsters 20 may be mounted on a subtrack 186 to allow the bolsters 20 to move forward relative to the cushion 36. The subtrack 186 includes a slide track 188 mounted on an inward side 190 of the bolster 20 facing the cushion 36 and a base shoe 196 fixedly mounted on the seat base 112 that slidably engages the slide track 188 to allow the bolster 20 to slide fore and aft relative the seat base 112. In order to move the bolsters 20 in unison with the thigh support 38 operatively coupled with the seat pan 114, a pair of coupling pins 192 are mounted on an outward side 194 of the seat pan 114. The coupling pins 192 engage openings 198 provided at a forward end 200 of the slide track 188. Accordingly, as the bolsters 20 are caused to move forward relative the center seat cushion 36, the forward edge 24 of the bolster 20 stays fixed relative the forward edge 40 of the thigh support 38 as the center seat cushion 36 elongates. The subtrack 186 thus allows the bolsters 20 to move in conjunction with the movement of the thigh support 38.

Also, the subtrack 186 could be oriented at an angle of approximately 5 degrees from the centerline of the seat, such that the bolsters 20 are allowed to angle out to maintain a consistent surface when the thigh support 38 has an angled lateral side as it elongates. Additionally, the bolster 20 can be a completely separate component from the center seat cushion 36 structure, and coupled to the center seat cushion 36 via the subtrack 186 only on each side of the center seat cushion 36.

Moreover, it will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure and methods without departing from the concepts of the present invention, and further it is to be understood that such concepts are intended to be covered by the following claims unless these claims by their language expressly state otherwise.

What is claimed is:

1. A vehicle seating assembly for a vehicle comprising:
a lower seat and a raised seatback, the lower seat having a center seat cushion and a forward thigh supporting portion, the forward thigh supporting portion having a first retracted position and a second extended position, wherein a leading edge of the forward thigh supporting portion is longitudinally displaced forward of the lower seat in the second extended position of the forward thigh supporting portion relative the first retracted position of the forward thigh supporting portion;
a seat bolster coupled with the forward thigh supporting portion extending laterally from at least one side of the seat, wherein the seat bolster has a first retracted position and a second extended position; and
a user control operably coupled to the forward thigh supporting portion and operational to move the forward thigh supporting portion between the first retracted position of the forward thigh supporting portion and the second extended position of the forward thigh supporting portion, which simultaneously moves the seat bolster relative to the center seat cushion, respectively, between the first retracted position of the seat bolster and a second extended position of the seat bolster;
wherein the seat bolster is mounted on a slide track and the forward thigh supporting portion is coupled with the seat bolster by a coupling pin received within an opening provided in the slide track.

2. The vehicle seating assembly of claim 1, further comprising:
an extendable and retractable seat pan having a first retracted position and a second extended position operably coupled to a seat base fixedly mounted relative the seat pan, wherein the forward thigh supporting portion is mounted to the seat pan;
a base engagement member mounted on one of either the seat pan or the seat base;
a drive gear mounted on the other of either the seat pan or the seat base; and
a motor operatively coupled with the base engagement member to rotate the drive gear and longitudinally displace the seat pan between the first retracted position of the seat pan and the second extended position of the seat pan.

3. The vehicle seating assembly of claim 2, wherein the motor is operably coupled with the base engagement member by a rod extending across the seat base into elongated slots in the seat pan on which the base engagement member is mounted and a drive shaft is operably connected with the rod and adapted to rotate the rod, whereby rotation of the drive shaft causes longitudinal displacement of the base engagement member and the seat pan.

4. The vehicle seating assembly of claim 3, wherein the base engagement member comprises a linear rack having teeth disposed thereon and the rod is coupled to the base engagement member by a drive gear.

5. The vehicle seating assembly of claim 4, wherein the vehicle seating assembly further comprises a linear rack tilt engagement member having teeth disposed thereon that may be selectively brought into and out of engagement with the drive gear and is operable between a first position out of contact with the drive gear and a second position in contact with the drive gear, wherein rotation of the drive shaft when the engagement member is in engagement with the drive gear causes rotation of the seat pan and elevation of the forward thigh supporting portion.

6. The vehicle seating assembly of claim 1, wherein displacement of the forward thigh supporting portion creates a gap between the forward thigh supporting portion and the center seat cushion of the lower seat, the vehicle seating assembly further comprising a flexible fabric that covers the gap.

7. The vehicle seating assembly of claim 1, further comprising a pair of bolsters on each side which simultaneously move relative to the center seat cushion between the first retracted position of the seat bolsters and the second extended position of the seat bolsters simultaneously with movement of the forward thigh supporting portion.

8. A vehicle seating assembly for a vehicle comprising:
a seatback and a seat;
a thigh support moveable longitudinally forward and rearward between a fully extended position of the thigh support and a fully retracted position of the thigh support;
bolsters extending laterally from the seat and operatively coupled with the thigh support and moveable between a fully extended position of the bolster and a fully retracted position of the bolster;
a seat pan operably coupled with the thigh support and moveable longitudinally forward and rearward between a fully extended position of the seat pan and a fully retracted position of the seat pan; and
a seat base fixedly mounted relative the seat pan and supporting the seat pan;
wherein the bolsters are each mounted on a slide track and the thigh support is coupled with the bolsters by a coupling pin received within an opening provided in the slide track.

9. The vehicle seating assembly of claim 8, wherein the seat pan is operably connected to the seat base and a base engagement member is mounted on the seat pan, wherein a motor is operatively coupled with the base engagement member and is operable by a user to move the seat pan between the fully extended position of the seat pan and the fully retracted position of the seat pan.

10. The vehicle seating assembly of claim 9, wherein the motor is operably coupled with the base engagement member by a rod extending across the seat base into elongated slots in the seat pan on which the base engagement member mounted motor is provided and a drive shaft is operably connected with the rod and adapted to rotate the rod, whereby rotation of the drive shaft with the base engagement member causes longitudinal displacement of the seat pan.

11. The vehicle seating assembly of claim 8, further comprising a tilt engagement member for pivotally moving the thigh support up and down between a fully lowered position and a fully raised position.

12. A vehicle seating assembly for a vehicle comprising:
a seat having a thigh support;
bolsters extending laterally from the seat and coupled with a side of the thigh support; and
a control operably coupled to a motor, wherein the thigh support and the bolster are adjustable between a forward position and a rearward position;
wherein the bolsters are each mounted on a slide track and the thigh support is coupled with the bolsters by a coupling pin received within an opening provided in the slide track.

13. The vehicle seating assembly of claim 12, wherein an extendable and retractable seat pan is operably connected to a seat base fixedly mounted relative the seat pan and a base engagement member is mounted on the seat pan; and a motor operatively coupled with the base engagement member to displace the thigh support between the forward position and the rearward position.

14. The vehicle seating assembly of claim 13, further comprising a base engagement member having a linear rack with teeth disposed thereon and a rod coupled to the base engagement member with a drive gear;

the vehicle seating assembly further comprising a motor operably coupled with the base engagement member by the rod extending across the seat base into elongated slots in the seat pan on which the base engagement member is mounted and a drive shaft operably connected with the rod and adapted to rotate the rod, whereby rotation of the drive shaft relative the base engagement member causes longitudinal displacement of the seat pan.

15. The vehicle seating assembly of claim 14, wherein the seat base further comprises a tilt engagement member for pivotally moving the thigh support up and down between a fully lowered position and a fully raised position.

16. The vehicle seating assembly of claim 15, wherein the tilt engagement member comprises a linear rack having teeth disposed thereon and the rod is coupled to the tilt engagement member with the drive gear.

17. The vehicle seating assembly of claim 13, wherein the bolsters are mounted on a slide track and the seat base includes a base shoe slidably received within the slide track.

18. The vehicle seating assembly of claim 13, wherein the seat pan is operably connected to the seat base through cooperating longitudinal channels.

19. The vehicle seating assembly of claim 12, wherein the thigh support has a leading edge and the bolsters have a leading edge that moves simultaneously between the forward position and the rearward position with the leading edge of the thigh support.

* * * * *